Dec. 28, 1926.  
A. A. KACZMAREK  
NUT LOCK  
Filed May 11, 1926  
1,612,128

Inventor  
Albert A. Kaczmarek

By *Clarence A. O'Brien*  
Attorney

Patented Dec. 28, 1926.

1,612,128

UNITED STATES PATENT OFFICE.

ALBERT ANTONY KACZMAREK, OF NEW BEDFORD, MASSACHUSETTS.

NUT LOCK.

Application filed May 11, 1926. Serial No. 108,313.

The present invention relates to nut locks and aims to provide an exceedingly simple construction that may be manufactured at very low cost but will prove thoroughly efficient and reliable in use, strong and durable, not likely to easily become out of order and otherwise well adapted for the purpose for which it is designed.

With the above and numerous other objects in view as will appear as the description proceeds, the invention resides in certain novel features of construction, and in the combination and arrangement of parts as will be hereinafter more fully described and claimed.

In the drawing:—

Figure 1:
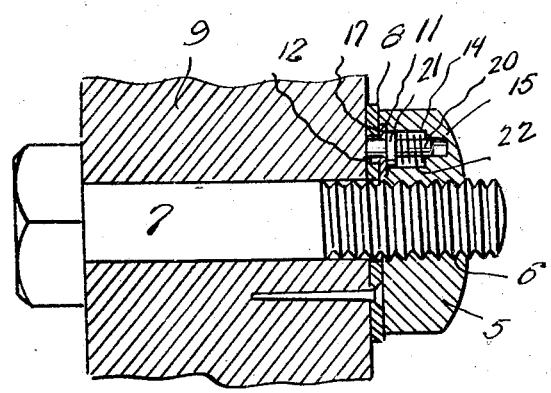
Figure 1 is a sectional view through a nut, showing my invention incorporated thereof and showing a bolt in elevation.
Figure 2:
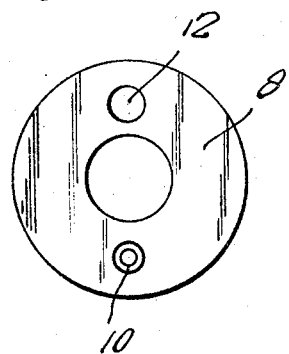
Figure 2 is a plan view of a washer which may be used with my improved nut lock.
Figure 3:
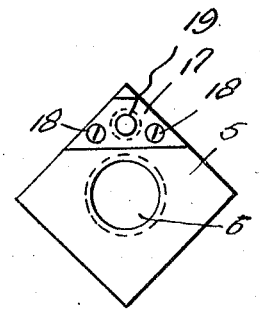
Figure 3 is a plan view of a nut embodying the features of this invention.

Referring to the drawing in detail it will be seen that the numeral 5 designates a nut which is provided with the usual threaded bore 6 for engaging the threaded portion of a bolt 7. A washer 8 may be mounted on the bolt 7 between the nut 5 and an object 9 through which the bolt passes. This washer is provided with a countersunk opening 10 in order that a fastening element 11 may pierce the same and be driven into the object 9 and diametrically opposed to the opening 10 another opening 12 is provided. If desired, the opening 12 may be in the form of a recess, or if desired a recess may be provided in the object 9. The nut 5 is provided with an off center bore having a relatively large portion 14 and a relatively small inner portion 15. A recess 16 is provided at the entrance of the off center bore for the reception of a plate 17 which may be held in place by screws 18 and has an opening 19 of the same diameter with the small portions 15 of the off center bore. A plunger 20 has its ends slidable in the small portion 15 and through the opening 19 of the plate 17. On an intermediate portion of the plunger there is provided an enlargement or head in the nature of an annular flange 21 which is slidable in the large portion 14. A spring 22 is disposed about the plunger 20 and impinges against the head 21 and the shoulder formed at the juncture of the portions 14 and 15 of the off center bore and normally hold the outer end of the plunger projected so as to engage in the opening 12 for locking the nut on the bolt.

From the above detailed description it will be seen that I have provided a very simple nut lock structure that is exceedingly compact in its arrangement of parts and is thoroughly convenient from the standpoint of manufacture and assembly and disassembly. The present embodiment of the invention has been disclosed in detail merely by way of example since in actual practice it attains the features of advantages enumerated as desirable in the statement of the invention and the above description. It will be apparent that changes in details of construction may be resorted to without departing from the spirit or scope of the invention as hereinafter claimed or sacrificing any of its advantages.

Having thus described my invention, what I claim as new is:—

As a new article of manufacture, a nut lock of the class described including a nut having an off center recess provided with a large portion and a small inner portion and a recess at the entrance of said off center bore, a plate fixed in the recess and having an opening equal in diameter to the small portion of the off center bore, a plunger slidable in the small portion of the off center bore and through the opening of the plate, an enlargement on the plunger slidable in the large portion of the off center bore, and a spring disposed about the plunger and impinging against the enlargement on the plunger and a shoulder formed by the juncture of the large portion and small portion of the off center bore.

In testimony whereof I affix my signature.

ALBERT ANTONY KACZMAREK.